US 6,648,420 B1

(12) United States Patent
Bontrager (10) Patent No.: US 6,648,420 B1
(45) Date of Patent: Nov. 18, 2003

(54) TAILGATE APPARATUS FOR A DUMPSTER-TYPE DUMP TRUCK

(76) Inventor: Ernest Bontrager, 4125 Prescott St., Sarasota, FL (US) 34232

(*) Notice: Subject to any disclaimer, the term of this patent is extended or adjusted under 35 U.S.C. 154(b) by 0 days.

(21) Appl. No.: 10/185,926

(22) Filed: Jun. 27, 2002

(51) Int. Cl.⁷ ................................................ B60P 1/04
(52) U.S. Cl. .................... 298/235; 298/23 A; 298/23 D
(58) Field of Search ............................ 298/23 S, 23 A, 298/23 B, 23 D; 296/56; 414/467, 469

(56) References Cited

U.S. PATENT DOCUMENTS

| | | | |
|---|---|---|---|
| 3,230,014 A | | 1/1966 | Mutti |
| 3,721,469 A | * | 3/1973 | Senesac et al. |
| 3,890,006 A | | 6/1975 | Stockwell |
| 4,059,307 A | | 11/1977 | Neufeldt |
| 4,068,892 A | | 1/1978 | Welch |
| 4,165,897 A | * | 8/1979 | Schmidt ...................... 296/56 |
| 4,371,208 A | | 2/1983 | Stricker |
| 4,699,428 A | | 10/1987 | Vick |
| 5,092,656 A | * | 3/1992 | Eldridge ................... 298/23 S |
| 5,100,279 A | * | 3/1992 | Bjerk .................... 298/23 MD |
| 5,249,843 A | * | 10/1993 | Hagenbuch et al. ... 298/23 MD |
| 5,474,363 A | * | 12/1995 | Hagenbuch ........... 298/23 MD |
| 6,015,191 A | | 1/2000 | Bontrager |
| 6,092,863 A | * | 7/2000 | Hagenbuch et al. .......... 296/56 |
| 6,170,916 B1 | * | 1/2001 | Lawson ................. 298/23 MD |
| 6,189,976 B1 | * | 2/2001 | Lawson ................. 298/23 MD |
| 6,491,349 B2 | * | 12/2002 | McCafferty et al. ....... 298/23 D |
| 6,517,143 B2 | * | 2/2003 | Hagenbuch ................... 296/56 |

FOREIGN PATENT DOCUMENTS

| | | | |
|---|---|---|---|
| AU | 209586 | 7/1957 | |
| JP | 60-193735 | * 10/1985 | ........... 298/23 MD |
| JP | 61-12445 | * 1/1986 | ............... 298/23 D |
| JP | 61-64545 | * 4/1986 | ............... 298/23 D |
| JP | 61-64546 | * 4/1986 | ............... 298/23 D |
| JP | 61-67640 | * 4/1986 | ............... 298/23 D |

* cited by examiner

Primary Examiner—Joseph D. Pape
Assistant Examiner—H. Gutman
(74) Attorney, Agent, or Firm—Charles J. Prescott (57) ABSTRACT

A tailgate apparatus pivotally connected to a dump truck for automatically opening and closing a tailgate mounted at the rear of a dumpster box which, in the conventional mode of use, is supportively engaged atop and slidably or rollably removable from a tiltable truck bed of the dump truck. The tailgate is releasably secured against the ends of the side walls and bottom of the dumpster box when the truck bed is in a horizontal position. In a second mode of use, the truck bed is tiltable with respect to a chassis of the dump truck whereupon the tailgate arcuately opens in proportion to the angular tilting movement of the truck bed. The dumpster box may also be removed from the truck bed while maintaining the tailgate in a closed and secured condition.

16 Claims, 5 Drawing Sheets

TAILGATE APPARATUS FOR A DUMPSTER-TYPE DUMP TRUCK

BACKGROUND OF THE INVENTION

1. Scope of Invention

This invention relates generally to a tiltable truck bed of a dump truck, and more particularly to a tailgate apparatus for automatically pivotally opening and closing the tailgate apparatus of a dumpster box of a dump truck in an amount directly responsive to, and positively controlled by, the tilted angle of the truck bed.

2. Prior Art

A tailgate of a dump truck having a tiltable truck bed for emptying debris piled into the truck bed is typically attached to the upper rear ends of the side walls by a pivotal connection with the upper corners of the tailgate. When dumping a load of debris, the lower or bottom edge of the tailgate is released from a locked position by an operator and allowed to pivot outwardly from the side walls and the bottom of the truck bed as the truck bed is tilted upwardly.

To dump a load of debris, however, these typical dump trucks require that the operator physically unlock the tailgate before the truck bed is raised. Likewise, the operator must then resecure the otherwise freely pivotable tailgate before leaving the dump sight.

An improved tailgate apparatus is disclosed in U.S. Pat. No. 4,068,892 invented by Welch disclosing a tailgate apparatus which does apparently by gravity automatically raise and lower without the use of a power source and without the need for a locking device which prevents the tailgate from opening while debris is being transported within the truck bed.

However, all of the prior art devices and apparatus known to applicant, including the above Welch invention, do not provide for a positive means for lifting the tailgate above the plane of the upper margins of the side walls to readily facilitate dumping debris contained within the truck bed and which may be piled higher than the side walls. Typically, debris from tree cuttings, paper collection and other debris of a less dense nature can easily be piled above the side walls of the dump truck and remain there secured whether covered or uncovered, while being transported.

However, when the prior art dump truck bed is tilted for dumping, the debris piled high above the side walls will jamb and become wedged on the tailgate or tilting mechanism to prevent effective dumping. In such circumstances, the operator must again move to the rear of the truck bed and physically dislodge the jammed debris to effect complete dumping thereof.

An unpatented rear end dump truck is currently being manufactured by Workman and Sons, Inc. of Prineville, Oreg. which somewhat addresses this problem of dumping debris piled higher than the side walls of the truck bed. However, the Workmen-type and dump trucks address this issue by simply adding structure above the side walls near the ends thereof so that the pivotal point of the tailgate is substantially raised above the upper margins of the side walls.

Applicant is aware of several other patented prior art dump truck arrangements, none of which are as similar to the present invention as those prior art devices above described. These additional patented inventions are disclosed in the following U.S. patents:

U.S. Pat. No. 3,890,006 to Stockwell
U.S. Pat. No. 4,371,208 to Stricker
U.S. Pat. No. 4,699,428 to Vick
U.S. Pat. No. 4,059,307 to Neufeldt
U.S. Pat. No. 3,230,014 to Mufti, et al.
U.S. Pat. No. 4,343,511 to Rowan et al.
U.S. Pat. No. 4,659,147 to Smitneek
U.S. Pat. No. 5,030,053 to Wickizer
U.S. Pat. No. 5,100,279 to Bjerk
U.S. Pat. No. 4,269,039 to Baker
U.S. Pat. No. 1,363,917 to Read
U.S. Pat. No. 1,547,525 to Saxon et al.
U.S. Pat. No. 1,821,384 to Larson
U.S. Pat. No. 3,721,469 to Senesac et al.
U.S. Pat. No. 4,068,892 to Welch
U.S. Pat. No. 6,193,460 to Damico In U.S. Patent 6,015,191, applicant does provide a tailgate apparatus for a dump truck which arcuately moves the tailgate in positive fashion in direct response to the angular tilting of the truck bed. The tailgate, when substantially fully opened by the truck bed being fully tilted for dumping, is positioned substantially above a plane defined by the upper margins of the side walls so that debris piled higher than the side walls will be easily dumped without the need for manual operator assistance. Further, the tailgate will be securely retained in the closed position without the need for operator locking, although same is preferred for secondary or supplemental insurance of tailgate lockage.

There has developed an unfilled need with respect to dumpster-type dump trucks which include a dumpster box which is removable from the truck bed. Typically, dumpster boxes are left at a refuse collection site such as a construction site, and then are removed after they are filled with debris. The present invention allows the dumpster box to not only be used in the conventional manner by being left at a collection site and then removed for refuge disposal by sliding the dumpster box on and off from a tiltable truck bed, but also adds the feature of a pivotal tailgate apparatus which will allow the dumpster box to function in the same fashion as the dump truck described in the previous '191 referenced U.S. patent.

BRIEF SUMMARY OF THE INVENTION

This invention is directed to a tailgate apparatus pivotally connected to a dump truck for automatically opening and closing a tailgate mounted at the rear of a dumpster box which, in the conventional mode of use, is supportively engaged atop and slidably or rollably removable from a tiltable truck bed of the dump truck. The tailgate is releasably secured against the ends of the side walls and bottom of the dumpster box when the truck bed is in a horizontal position. In a second mode of use, the truck bed is tiltable with respect to a chassis of the dump truck whereupon the tailgate arcuately opens in proportion to the angular tilting movement of the truck bed. The dumpster box may also be removed from the truck bed while maintaining the tailgate in a closed and secured condition.

It is therefore an object of this invention to provide a tailgate apparatus for a dump truck having a removable dumpster box which will automatically open in response to tilting of the truck bed of the dump truck, regardless of the character and volume of the load of debris in the dumpster box.

It is another object of this invention to provide a tailgate apparatus for a dumpster box-type dump truck which does not require the operator of the dump truck to release any locking mechanism of the tailgate prior to load dumping.

It is still another object of this invention to provide a tailgate apparatus for a removable dumpster box-type dump truck which will arcuately move from a closed position as the truck bed is tilted for dumping into a position substantially above the upper margins of the side walls to facilitate dumping of debris piled above the side walls in the dumpster box without the need for operator assistance.

It is yet another object of this invention to provide a tailgate apparatus for a dumpster box of a dump truck which will be held in a substantially closed position when the truck bed is in the horizontal position without the need for an operator locking the tailgate from random opening movement.

Still another object of this invention is to provide a tailgate apparatus for a dumpster box of a dump truck which allows for the dual modes of use of the dumpster box on both tilting and off-loading of the dumpster box and the tilt emptying thereof without removal of the dumpster box from the truck bed.

In accordance with these and other objects which will become apparent hereinafter, the instant invention will now be described with reference to the accompanying drawings.

DETAILED DESCRIPTION OF THE INVENTION

PRIOR ART

Figure 1:
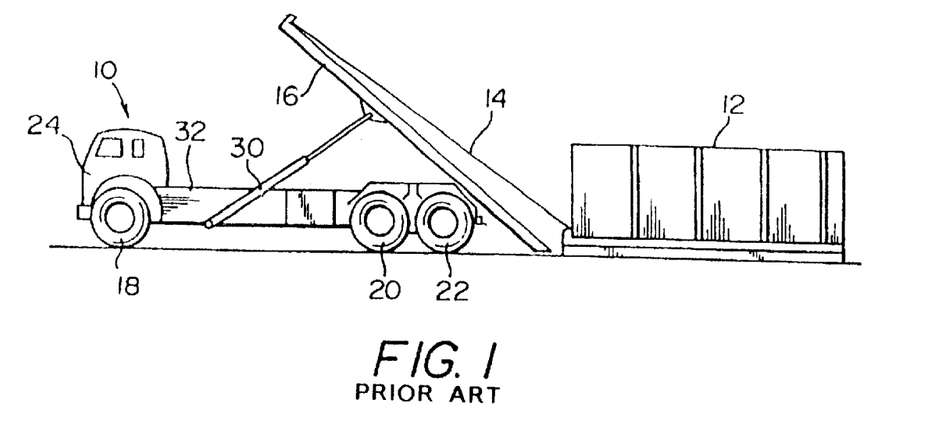
FIG. 1 is a side elevation view of a prior art dumpster-type truck having a tiltable bed and a separable dumpster box having been offloaded from the truck bed.
Figure 2:
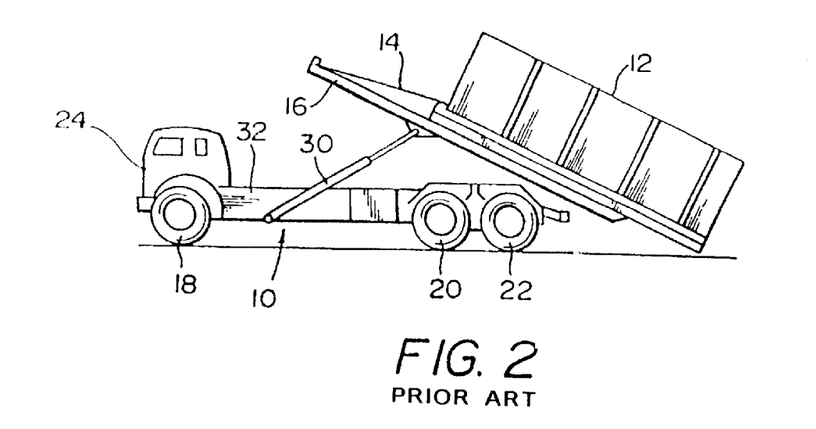
FIG. 2 is a side elevation view of FIG. 1 illustrating the in-progress loading or offloading of the dumpster box.
Figure 3:
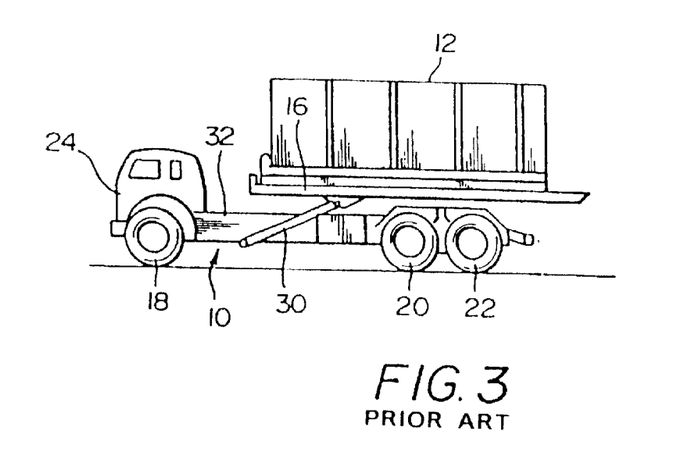
FIG. 3 is view of the prior art dumpster-type truck of FIG. 1 with the dumpster box loaded atop the truck bed in its horizontal position.

FIGS. 1 to 3 illustrate a typical dumpster box-type dump truck shown generally at numeral 10. The dump truck 10 includes a frame or chassis 32 and a tiltable and extendable truck bed 16. The vehicle is supported on front and rear wheels 18, 20 and 22 and also includes a cab 24. Linearly operable hydraulic actuators 30 are pivotally attached to the frame 32 and to the truck bed 16 for controlling the pivotal movement of the truck bed 16. The dumpster box 12 is typically on-loaded and off-loaded from the tiltable truck bed 16 by use of a retractable and extendable cable 14 as regulated by a separate actuator (not shown).

THE INVENTION

Referring now to FIGS. 4 to 8, the invention is there shown in part at numeral 40 and includes a dumpster box 42 supported atop a tiltable truck bed 64 66. The truck bed 66 is pivotally connected to a truck chassis 44 about a first transverse axis 48. The truck bed 66 is thus pivotally tiltable about the first transverse axis 48 by a hydraulic actuator (not shown), similar to that seen in FIGS. 1 to 3.

Figure 4:
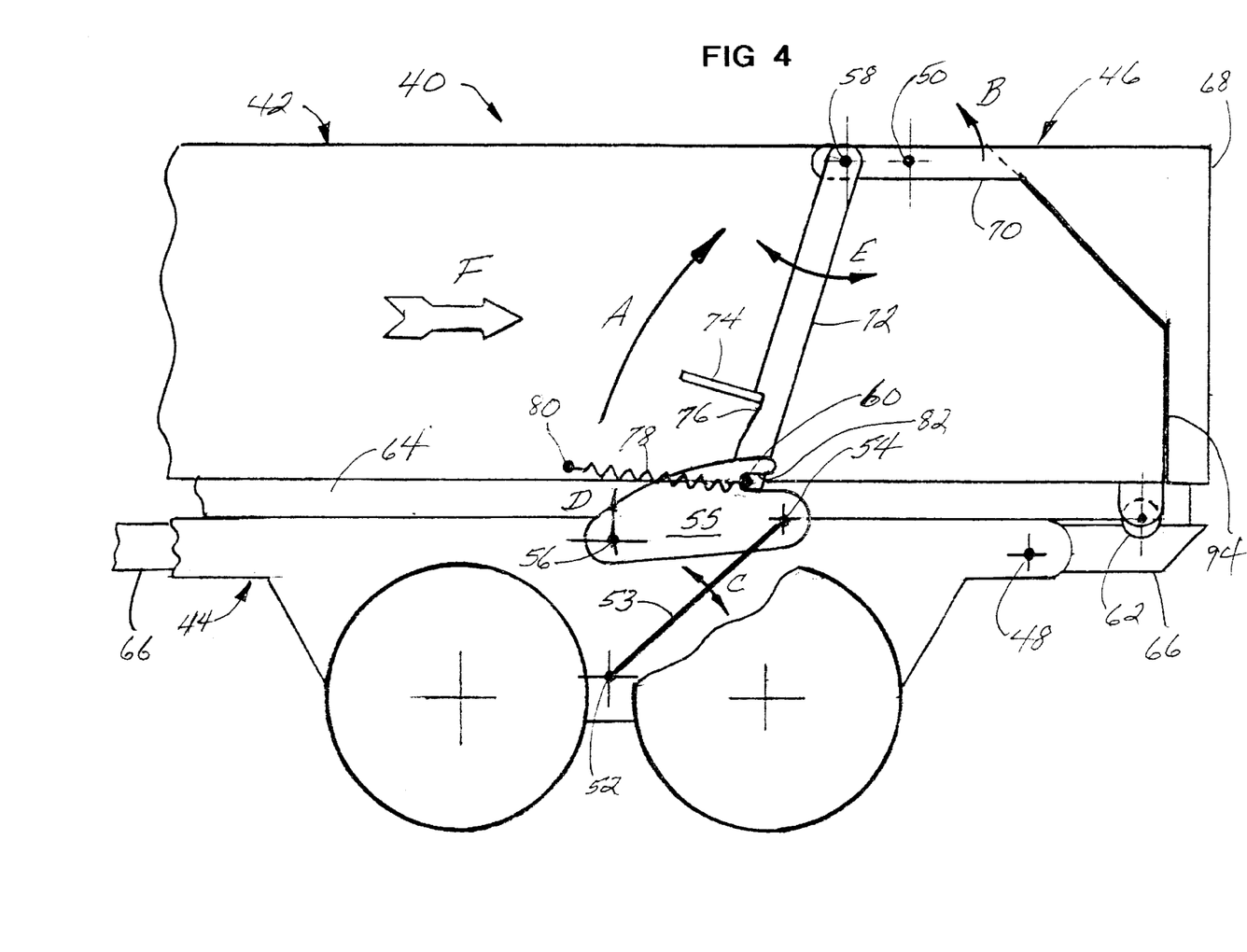
FIG. 4 is a partial side elevation view of the present invention attached to a dump truck having a tiltable bed and a removable dumpster box.

The dumpster box 42 typically includes a flat bottom 64 and upright side and front walls which define an upwardly open interior volume 84 into which debris and trash are accumulated. The tailgate apparatus 46 includes a rectangular rigid tailgate 68 which is sized to fit against the upright ends 94 of the open rear end of the dumpster box 42. A pair of elongated, rigid, spaced apart, substantially parallel gate arms 70 are rigidly connected and orthogonally disposed forwardly of the upper corners of the tailgate 68. Triangular bracing rigidly re-enforces the orthogonal relationship between these gate arms 70 and the tailgate 68.

Each of the gate arms 70 extend forwardly from the tailgate 68 and are pivotally connected to the dumpster box 42 about a second transverse axis 50 which is positioned forwardly of the ends 94 of the side walls. An elongated rigid pivot link 72, preferably positioned just outboard of each of the sidewalls of the dumpster box 42, is pivotally connected to a pivotal connection 58 about a fourth transverse axis which is positioned forwardly of the second transverse axis 50. By these arrangements, the tailgate apparatus 46 is pivotable about the second transverse axis 50 in the direction of arrow B, while the pivot link 72 is dependently pivotable in the direction of arrow E about the fourth transverse axis at pivot point 58.

A pivot control rod 53 is pivotally connected at a lower end thereof to a third transverse axis 52 and is pivotable thereby in the direction of arrow C in FIG. 4. A pivot plate 55 is connected at a rearward end thereof at a first pivot connection 54 to the upper end of the pivot control rod 53. Preferably a pair of pivot plates 55 are positioned in close proximity to either side of the dumpster box 42 and are tied together by a cross bar 56.

A pivot pin 60 connected to and orthogonally outwardly extending from the lower end of the pivot link 72 is pivotally engageable into a rearwardly opening slot 82 formed into the pivot plate 55. By this arrangement, rotational movement of the pivot plate 55 in the direction of arrow D is governed by the tilting movement in the direction of arrow A of the dumpster box 42 about the first transverse axis 48.

When the dumpster box 42 is in its horizontal position atop the truck bed 66, the pivot link 72 is biasingly engaged against a stop 74 within locking notch 76 as seen in FIG. 4. A biasing member 78 is attached at one end thereof to the pivot pin 60 and at the other end thereof to an anchor point 80 attached into the side wall of the dumpster box 42. Note that the one end of the biasing member 78 may also be attached to the pivot link 72 directly to accomplish the primary purpose of maintaining this locking engagement.

Figure 5:
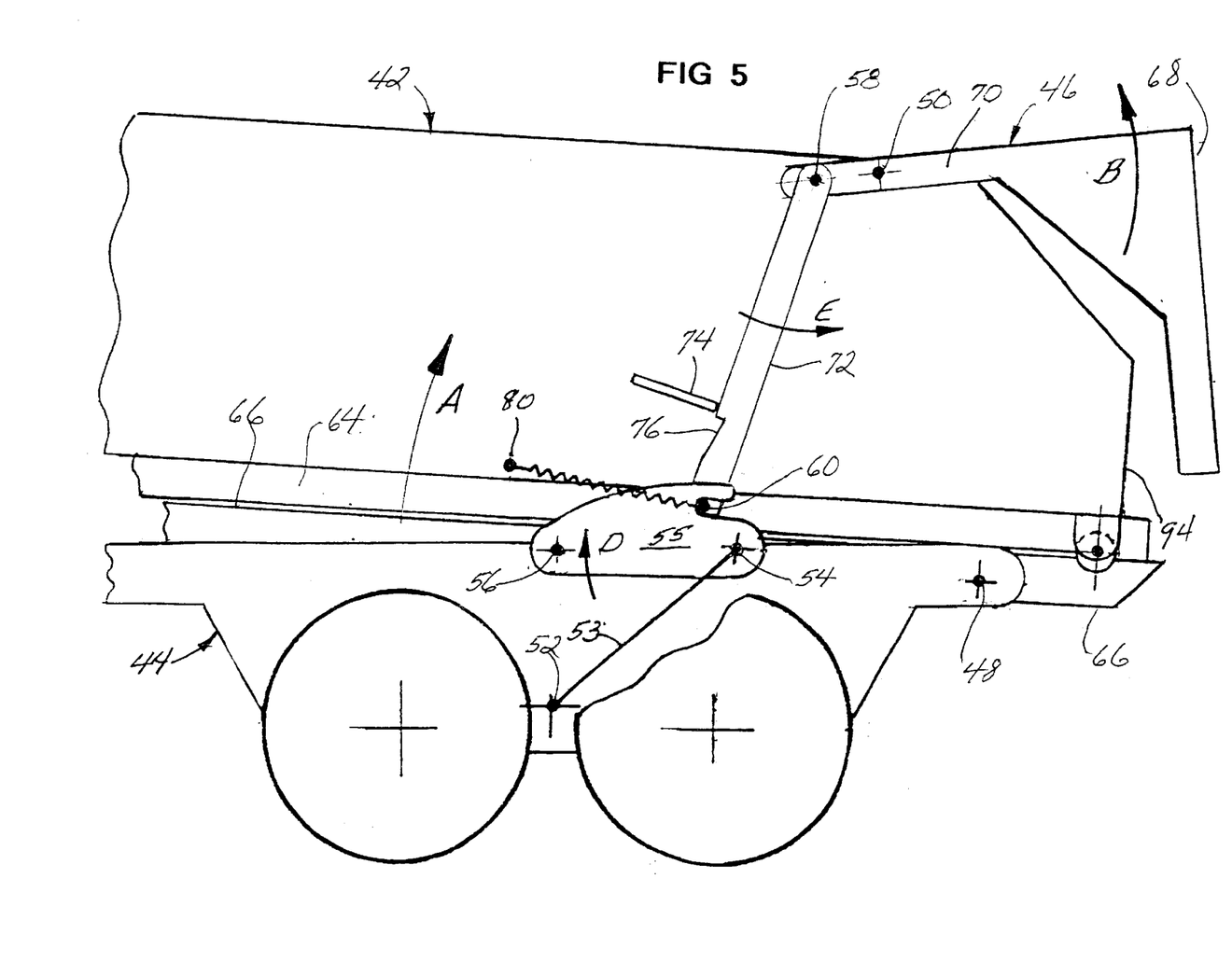
FIG. 5 is a view similar to FIG. 4 as the truck bed begins to tilt upwardly for dumping debris from the dumpster box and a corresponding partially open position of the tailgate apparatus.
Figure 6:
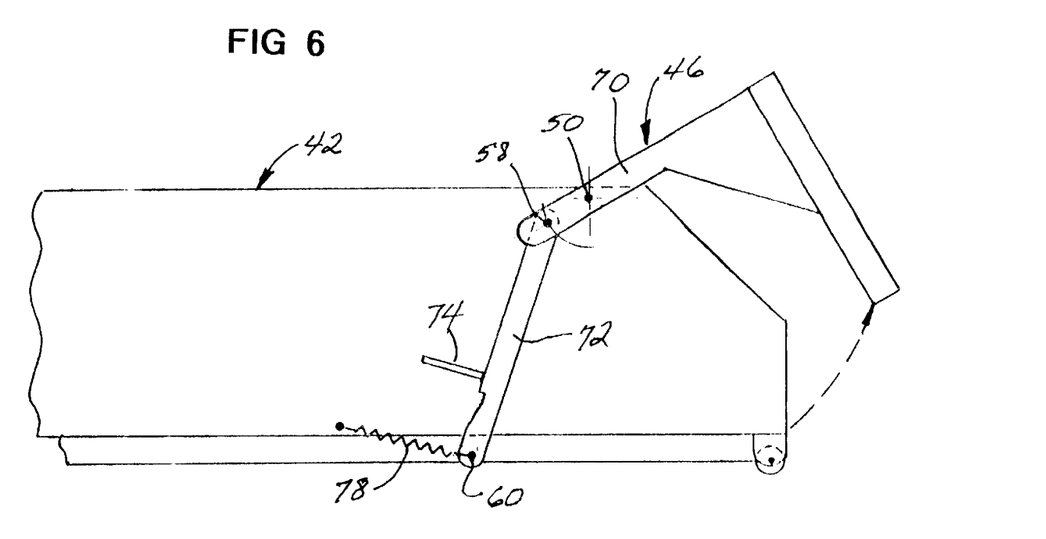
FIG. 6 is a simplified view of the dumpster box showing the progressive opening of the tailgate apparatus.
Figure 7:
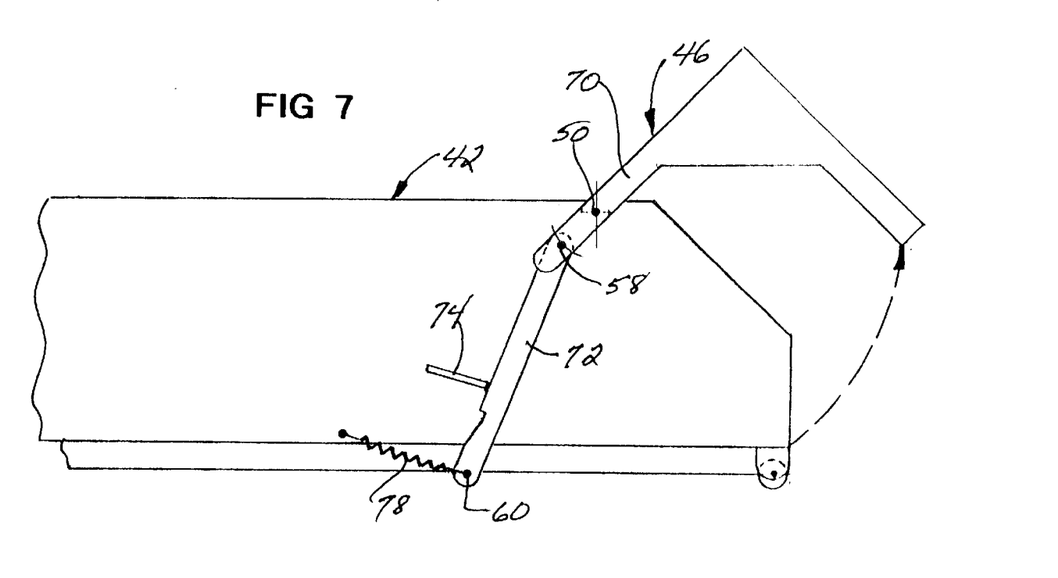
FIG. 7 is a view similar to FIG. 6 with the tailgate apparatus in a fully opened position.

As best seen in FIG. 5, just as the truck bed 66 begins to be tilted in the direction of arrow A, the pivot plate 55 is caused to rotate slightly in the direction of arrow D. This causes the pivot link 72 to move slightly in the direction of arrow E so as to disengage the locking notch 76 from the stop 74 which allows the dumpster box 42 to continue to be tilted upwardly in the direction of arrow A. Simultaneously, the tailgate apparatus 46 begins to open in the direction of arrow B about the second transverse axis 50 by the pulling force of the pivot link 72. As best seen in FIGS. 6 and 7, the stages of opening of the tailgate apparatus 46 are there shown.

In the preferred embodiment, the elongated transversely extending cross bar 56 is rigidly connected at each end thereof to one of two pivot plates 55 on either side of the truck chassis 44. The function of this cross bar 56 is to stabilize and maintain alignment between the two pivot plates 55. Accordingly, the cross bar 56 floats and is unattached to either the truck chassis 44 or the dumpster box 42, but may rest upon the truck chassis 44 when the dumpster box is horizontal or removed entirely from the truck chassis 44.

Referring again to FIG. 4, the dumpster box 42 may also be slidably or rollably disengaged from the truck bed 66 without releasing or opening the tailgate apparatus 46 by rearwardly sliding the entire dumpster box 42 in the direction of arrow F as facilitated by support rollers shown typically at 62. This is the normal mode of use of the dumpster box 42. Because slot 82 opens rearwardly, it will automatically disengage from the tilting pin 60 so that, as the dumpster 42 is rearwardly slid in the direction of arrow A, the tailgate apparatus 46 is held in the locked position by the pivot link 72 in locking engagement with stop 74, which locking interengagement is maintained by biasing spring 78. Note again that simply sliding the dumpster box 42 rearwardly on its frame rails 64 will allow pivot pins 60 to automatically disengage from slots 82 also.

By this arrangement, as an alternate and more conventional form of use, the dumpster box 42 may be slidably or rollably removed from the truck bed 66 with the tailgate apparatus 46 in its locked configuration to ensure that any debris or trash presently within the dumpster box 42 will not be inadvertently dumped out of the ground should the tailgate apparatus 46 be in a partially opened position.

Figure 8:
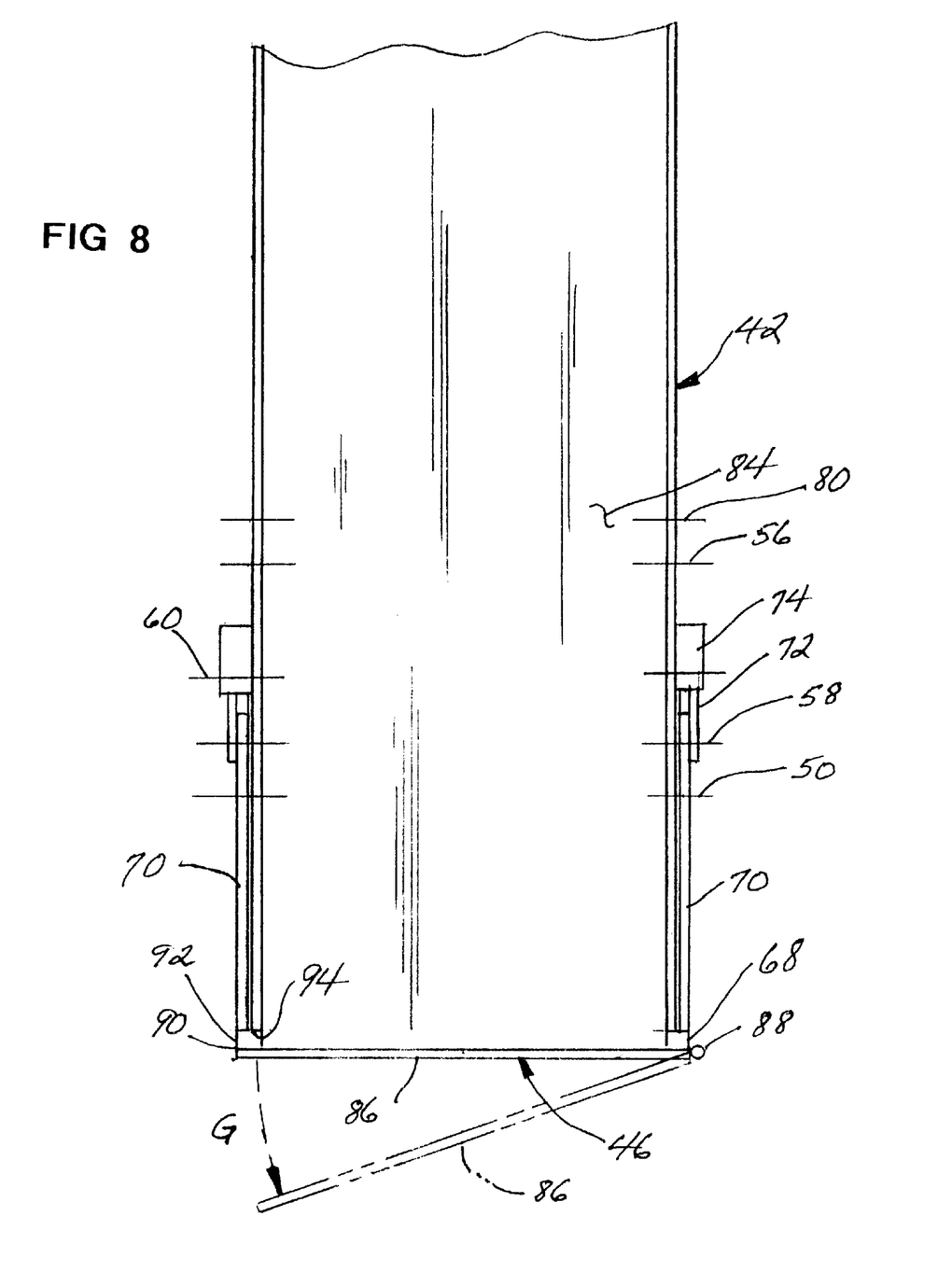
FIG. 8 is a top plan view of the tailgate apparatus attached to the rear of a dumpster box showing an alternate mode of opening of the tailgate in phantom.

Lastly in FIG. 8, an alternate mode for operating the tailgate 86 itself is accomplished by the pivotal hinge mounting at 88 about a vertical axis along one upright end of one side wall so that the tailgate 86 may be opened in the direction of arrow G. A separate locking arrangement at 90 lockably engages the tailgate 86 with an upright support 92 disposed along either upright margin of the ends of the side walls of the dumpster box 42.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A tailgate apparatus pivotally connected to a dump truck for automatically opening and closing a tailgate mounted at the rear of a dumpster box which is supportively engaged atop and slidably or rollably removable from a tiltable truck bed of the dump truck, the dumpster box having upright front and side walls, said tailgate disposed adjacent ends of the side walls and a bottom of the dumpster box when the truck bed is in a horizontal position, the truck bed tiltable about a first transverse axis attached to a chassis of the dump truck, said first axis positioned forwardly of the end of, and in proximity to the bottom, the apparatus comprising:

a pair of elongated, spaced apart substantially parallel gate arms each pivotally connected adjacent a forward end thereof to a corresponding said side wall about a second substantially transverse axis positioned forwardly of, and in proximity to upper margins of the ends of the side walls and generally above said first axis;

said tailgate rigidly connected at each side margin thereof generally orthogonally to a corresponding rearward end of each said gate arm;

an elongated pivot control rod pivotally connected at one end thereof to the chassis about a third transverse axis positioned forwardly of said first transverse axis;

an elongated pivot link pivotally connected at an upper end thereof to one said gate arm about a fourth substantially transverse axis positioned forwardly of said second axis;

an intermediate pivot plate pivotally connected at a rearward portion thereof to the other end of said pivot control rod;

said pivot plate having a rearwardly opening slot and a stabilizing member connected thereto which, in cooperation with said pivot link, control the position and rotational orientation of said pivot plate;

said slot sized to receive a rotation pin connected to, and laterally extending from, a lower end of said pivot link;

said axes being so arranged, and said pivot plate being so configured, such that said tailgate arcuately opens responsive to tilted position of the truck bed about said first axis.

2. A tailgate apparatus as set forth in claim 1, wherein:
said pivot plate and said slot are cooperatively configured to automatically permit the rolling or sliding removal of the dumpster box from the truck bed.

3. A tailgate apparatus as set forth in claim 1, wherein:
said pivot link is biased in a normally locked condition to avoid inadvertent opening of said tailgate.

4. A tailgate apparatus as set froth in claim 1, wherein:
said slot is configured whereby the dumpster box is slidably or rollably removable by rearward movement thereof relative to the truck bed when the truck bed is in a horizontal orientation.

5. A tailgate apparatus pivotally connected to a dump truck for automatically opening and closing a tailgate mounted at the rear of a dumpster box which is supportively engaged atop and slidably or rollably removable from a tiltable truck bed of the dump truck, the dumpster box having upright front and side walls, said tailgate disposed adjacent ends of the side walls and a bottom of the dumpster box when the truck bed is in a horizontal position, the truck bed tiltable about a first transverse axis attached to a chassis of the dump truck, said first axis positioned forwardly of the end of, and in proximity to the bottom, the apparatus comprising:

a pair of elongated, spaced apart substantially parallel gate arms each pivotally connected adjacent a forward end thereof to a corresponding said side wall about a second substantially transverse axis positioned forwardly of, and in proximity to upper margins of the ends of the side walls and generally above said first axis;

said tailgate rigidly connected at each side margin thereof generally orthogonally to a corresponding rearward end of each said gate arm;

an elongated pivot control rod pivotally connected at a lower end thereof to the chassis about a third transverse axis positioned forwardly of, and lower than, said first transverse axis;

a pair of elongated pivot links each pivotally connected at an upper end thereof to a corresponding said gate arm about a fourth substantially transverse axis positioned forwardly of said second axis;

a pair of intermediate pivot plates each pivotally connected at a rearward portion thereof to an upper end of a corresponding said pivot control rod;

each said pivot plate having a rearwardly opening slot and a stabilizing member connected thereto which, in combination with said pivot link, control the position and rotational orientation of said pivot plate;

said slot sized to receive a rotation pin connected to, and laterally extending from, a lower end of said pivot link;

said axes being so arranged, and said pivot plate being so configured, such that said tailgate arcuately opens responsive a to tilting movement of the truck bed about said first axis.

6. A tailgate apparatus as set forth in claim 5, wherein:

said pivot plate is also configured to automatically permit the rolling or sliding removal of the dumpster box from the truck bed.

7. A tailgate apparatus as set forth in claim 5, wherein:

said pivot link is biased in a normally locked condition to avoid inadvertent opening of said tailgate.

8. A tailgate apparatus as set froth in claim 5, wherein:

said slot is configured whereby the dumpster box is slidably or rollably removable by rearward movement thereof relative to the truck bed when the truck bed is in a horizontal orientation.

9. A tailgate apparatus, in combination with a tiltable and removable dumpster box of a dump truck, said apparatus automatically opening and closing a tailgate mounted at the rear of the dumpster box supportively engaged atop a tiltable truck bed of the dump truck, comprising:

the dumpster box having upright front and side walls, said tailgate being disposed adjacent ends of the side walls and a bottom of the dumpster box when the truck bed is in a horizontal position;

the truck bed being tiltable about a first transverse axis attached to a chassis of the dump truck, said first axis positioned forwardly of, and in proximity to, the end of the bottom;

a pair of elongated, spaced apart substantially parallel gate arms each pivotally connected adjacent a forward end thereof to a corresponding said side wall about a second substantially transverse axis positioned forwardly of the ends of the side walls and generally above said first axis;

said tailgate rigidly connected at each side margin thereof generally orthogonally to a corresponding rearward end of each said gate arm;

an elongated pivot control rod pivotally connected at one end thereof to the chassis about a third transverse axis positioned forwardly of said first transverse axis;

an elongated pivot link pivotally connected at an upper end thereof to one said gate arm about a fourth substantially transverse axis positioned forwardly of said second axis;

an intermediate pivot plate connected at a rearward portion thereof to the other end of said pivot control rod and pivotally engaged with a lower end of said pivot link;

said axes being so arranged, and said pivot plate being so configured, such that said tailgate arcuately opens responsive to tilting movement of the truck bed about said first axis.

10. A tailgate apparatus as set forth in claim 9, wherein:

said pivot plate is also configured to automatically permit the rolling or sliding removal of the dumpster box from the truck bed.

11. A tailgate apparatus as set forth in claim 9, wherein:

said pivot link is biased in a normally locked condition to avoid inadvertent opening of said tailgate.

12. A tailgate apparatus as set froth in claim 9, wherein:

said pivot plate includes a rearwardly opening slot which is configured whereby the dumpster box is slidably or rollably removable by rearward movement thereof relative to the truck bed when the truck bed is in a horizontal orientation.

13. A tailgate apparatus pivotally connected to a dump truck for automatically opening and closing a tailgate mounted at the rear of a dumpster box which is supportively engaged atop and slidably or rollably removable from a tiltable truck bed of the dump truck, the dumpster box having upright front and side walls, said tailgate disposed adjacent ends of the side walls and a bottom of the dumpster box when the truck bed is in a horizontal position, the truck bed tiltable about a first transverse axis attached to a chassis of the dump truck, said first axis positioned forwardly of the end of, and in proximity to the bottom, the apparatus comprising:

a pair of elongated, spaced apart substantially parallel gate arms each pivotally connected adjacent a forward end thereof to a corresponding said side wall a bout a second substantially transverse axis positioned forwardly of the ends of the side walls and generally above said first axis;

said tailgate rigidly connected at each side margin thereof generally orthogonally to a corresponding rearward end of each said gate arm;

an elongated pivot control rod pivotally connected at one end thereof to the chassis about a third transverse axis positioned forwardly of said first transverse axis;

an elongated pivot link pivotally connected at an upper end thereof to one said gate arm about a fourth substantially transverse axis positioned forwardly of said second axis;

an intermediate pivot plate pivotally connected at a rearward portion thereof to the other end of said pivot control rod;

said pivot plate configured for pivotal engagement with a lower end of said pivot link, in cooperation with the arrangement of said axes whereby said tailgate arcuately opens responsive to a tilted position of the truck bed about said first axis.

14. A tailgate apparatus as set forth in claim 13, wherein: said pivot plate is also configured to automatically permit the rolling or sliding removal of the dumpster box from the truck bed.

15. A tailgate apparatus as set forth in claim 13, wherein: said pivot link is biased in a normally locked condition to avoid inadvertent opening of said tailgate.

16. A tailgate apparatus as set froth in claim 13, wherein:

said pivot plate includes a rearwardly opening slot which is configured whereby the dumpster box is slidably or rollably removable by rearward movement thereof relative to the truck bed when the truck bed is in a horizontal orientation.

* * * * *

UNITED STATES PATENT AND TRADEMARK OFFICE
CERTIFICATE OF CORRECTION

PATENT NO.     : 6,648,420 B1
DATED          : November 18, 2003
INVENTOR(S)    : Ernest Bontrager

It is certified that error appears in the above-identified patent and that said Letters Patent is hereby corrected as shown below:

Delete the Title page and substitute with the attached Title page.

Replace drawing sheets 1-5, consisting of Figures 1-8, with the attached drawing sheets.

Signed and Sealed this

Twenty-third Day of March, 2004

JON W. DUDAS
*Acting Director of the United States Patent and Trademark Office*

(12) United States Patent
Bontrager (10) Patent No.: US 6,648,420 B1
(45) Date of Patent: Nov. 18, 2003

(54) TAILGATE APPARATUS FOR A DUMPSTER-TYPE DUMP TRUCK

(76) Inventor: Ernest Bontrager, 4125 Prescott St., Sarasota, FL (US) 34232

(*) Notice: Subject to any disclaimer, the term of this patent is extended or adjusted under 35 U.S.C. 154(b) by 0 days.

(21) Appl. No.: 10/185,926

(22) Filed: Jun. 27, 2002

(51) Int. Cl.$^7$ .................................................. B60P 1/04
(52) U.S. Cl. .................... 298/235; 298/23 A; 298/23 D
(58) Field of Search ............................ 298/23 S, 23 A, 298/23 B, 23 D; 296/56; 414/467, 469

(56) References Cited

U.S. PATENT DOCUMENTS

| | | | |
|---|---|---|---|
| 3,230,014 A | | 1/1966 | Mutti |
| 3,721,469 A | * | 3/1973 | Senesac et al. |
| 3,890,006 A | | 6/1975 | Stockwell |
| 4,059,307 A | | 11/1977 | Neufeldt |
| 4,068,892 A | | 1/1978 | Welch |
| 4,165,897 A | * | 8/1979 | Schmidt ...................... 296/56 |
| 4,371,208 A | | 2/1983 | Stricker |
| 4,699,428 A | | 10/1987 | Vick |
| 5,092,656 A | * | 3/1992 | Eldridge .................... 298/23 S |
| 5,100,279 A | * | 3/1992 | Bjerk .................... 298/23 MD |
| 5,249,843 A | * | 10/1993 | Hagenbuch et al. ... 298/23 MD |
| 5,474,363 A | * | 12/1995 | Hagenbuch ............ 298/23 MD |
| 6,015,191 A | | 1/2000 | Bontrager |
| 6,092,863 A | * | 7/2000 | Hagenbuch et al. .......... 296/56 |
| 6,170,916 B1 | * | 1/2001 | Lawson ................ 298/23 MD |
| 6,189,976 B1 | * | 2/2001 | Lawson ................ 298/23 MD |
| 6,491,349 B2 | * | 12/2002 | McCafferty et al. ...... 298/23 D |
| 6,517,143 B2 | * | 2/2003 | Hagenbuch .................. 296/56 |

FOREIGN PATENT DOCUMENTS

| | | | |
|---|---|---|---|
| AU | 209586 | 7/1957 | |
| JP | 60-193735 | * 10/1985 | ........... 298/23 MD |
| JP | 61-12445 | * 1/1986 | ............... 298/23 D |
| JP | 61-64545 | * 4/1986 | ............... 298/23 D |
| JP | 61-64546 | * 4/1986 | ............... 298/23 D |
| JP | 61-67640 | * 4/1986 | ............... 298/23 D |

* cited by examiner

Primary Examiner—Joseph D. Pape
Assistant Examiner—H. Gutman
(74) Attorney, Agent, or Firm—Charles J. Prescott (57) ABSTRACT

A tailgate apparatus pivotally connected to a dump truck for automatically opening and closing a tailgate mounted at the rear of a dumpster box which, in the conventional mode of use, is supportively engaged atop and slidably or rollably removable from a tiltable truck bed of the dump truck. The tailgate is releasably secured against the ends of the side walls and bottom of the dumpster box when the truck bed is in a horizontal position. In a second mode of use, the truck bed is tiltable with respect to a chassis of the dump truck whereupon the tailgate arcuately opens in proportion to the angular tilting movement of the truck bed. The dumpster box may also be removed from the truck bed while maintaining the tailgate in a closed and secured condition.

16 Claims, 5 Drawing Sheets